United States Patent Office 3,266,928
Patented August 16, 1966

3,266,928
OXIDATION-RESISTANT COATING ON ARTICLES OF YTTRIUM METAL
David R. Wilder and Cecil D. Wirkus, Ames, Iowa, assignors to the United States of America as represented by the United States Atomic Energy Commission
No Drawing. Filed Sept. 25, 1963, Ser. No. 311,601
6 Claims. (Cl. 117—129)

The invention described herein was made in the course of, or under, a contract with the United States Atomic Energy Commission.

This invention deals with the coating of yttrium articles for the purpose of making them oxidation- and corrosion-resistant, in particular at elevated temperature.

In our copending application S.N. 196,535, filed on May 21, 1962, now U.S. Patent 3,109,752, granted November 5, 1963, a process is described for the coating of yttrium articles according to which a cerium-dioxide-containing glass is applied to the yttrium metal and fired thereon.

By this invention a coating has been composed which shows greatly superior protective characteristics and which has the further advantage that it does not necessitate pretreatment of the yttrium surface prior to application of the coating, although better results are obtained when the coating is applied to a precleaned yttrium surface.

The process of this invention comprises the steps of preparing an "oxidic mixture" of vanadium oxide and aluminum oxide, grinding this mixture to a fine homogeneous mass, suspending the mixture in a liquid medium, applying the suspension on the yttrium article to be protected, and firing the thus-coated article.

The ratio of vanadium dioxide to aluminum oxide in the oxidic mixture can vary widely; it can have a molar ratio of between 1 and 2.5. However, a molar ratio of between 1 and 1.65 for $V_2O_5:Al_2O_3$ is preferred.

Grinding of the mixture can be carried out by means known to those skilled in the art. Ball mills have been used with satisfaction for this purpose.

The oxidic mixture may be suspended in any liquid medium that has a relatively low boiling point; alcohols, and in particular ethyl alcohol, were found suitable.

As has been mentioned before, the yttrium surface does not require any pretreatment. The alcohol suspension is applied to the surface by known means, for instance by spraying or brushing. The so-coated article is then heated to between 1100 and 1250° C. for "firing"; this step can be carried out in any furnace known in the art. The article is preferably placed on a silica support arranged within the furnace. The oxidic coating does not stick to the silica support during firing.

The coating obtained by the process of this invention is a glass of crystalline structure. It proved to protect the yttrium metal articles from oxidation and corrosion influences at temperatures up to 900° C. for at least 60 hours.

Yttrium coated by the process of this invention is used as the structural material of crucibles for melting alloys, such as uranium-chromium alloys. It is also formed into vessels and pipes which are to hold liquid plutonium alloys in nuclear reactors.

In the following, an example is given for illustrative purposes.

*Example*

A hollow sealed cylinder of yttrium metal 1″ long, ¾″ in diameter and 0.040″ thick, was abraded to remove surface corrosion and then washed with trichloroethylene and then acetone.

A mixture of alumina and vanadia (weight ratio 2:1) in a liquid medium composed of water and ethyl alcohol (weight ratio 1:2) was ball-milled for one hour. The slurry thus obtained was sprayed on the yttrium cylinder. The cylinder with the coating was allowed to dry, and then it was inserted into a hot furnace of 1200° C. and fired therein in a normal atmosphere of air for three minutes.

The thus-coated cylinder was tested by heating it in air at 850° C. for 55 hours. No damage to the coating or the cylinder could be detected after this time.

In another run a cylinder of the same specifications as given above was coated with an alcohol suspension of a mixture of 95% by weight of a frit (70% by weight $P_2O_5$, 12% $Al_2O_3$, 14% $Na_2O_3$ and 4% $Fe_3O_4$) and 15% by weight of ceric oxide which is one of the coating compositions of the above-identified copending application; it also was applied by spraying. The coated cylinder, upon drying, was fired under conditions similar to those used for the first cylinder of this example coated by the process of this invention and tested as described above. This frit-$CeO_2$-coated cylinder proved satisfactorily protected only for about seven hours.

It will be understood that the invention is not to be limited to the details given herein but that it may be modified within the scope of the appended claims.

The embodiments of the invention in which an exclusive property or privilege is claimed are defined as follows:

1. A process of protecting yttrium metal surfaces from oxidation, comprising mixing vanadium oxide and aluminum oxide powders, suspending the mixture in a liquid medium, applying the suspension obtained to the yttrium surface to be protected, and firing the coated yttrium.

2. The process of claim 1 wherein vanadium oxide and aluminum oxide are mixed in quantities to yield a molar ratio of between 1 and 2.5.

3. The process of claim 2 wherein the molar ratio is between 1 and 1.65.

4. The process of claim 1 wherein the liquid medium is ethyl alcohol.

5. The process of claim 1 wherein firing is accomplished by heating to between 1100 and 1250° C.

6. A process of protecting the surfaces of yttrium metal articles from oxidation, comprising mixing vanadium oxide and aluminum oxide in quantities to yield a molar ratio of between 1 and 1.65; grinding the mixture to a fine, homogeneous mass; suspending the mixture in ethyl alcohol, applying the suspension obtained to the yttrium surface to be protected, and heating the coated yttrium article to between 1100 and 1250° C.

No references cited.

ALFRED L. LEAVITT, *Primary Examiner.*

J. R. BATTEN, JR., *Assistant Examiner.*